June 6, 1950            H. I. DANZIGER            2,510,464

MACHINE FOR SEALING CONDENSER BODIES IN SHELLS

Filed Oct. 11, 1946            2 Sheets-Sheet 1

INVENTOR.
Harold I. Danziger
George H. Fritzinger
ATTORNEY

June 6, 1950  H. I. DANZIGER  2,510,464
MACHINE FOR SEALING CONDENSER BODIES IN SHELLS
Filed Oct. 11, 1946  2 Sheets-Sheet 2

INVENTOR.
Harold I. Danziger
BY George H. Fritzinger
ATTORNEY.

Patented June 6, 1950

2,510,464

UNITED STATES PATENT OFFICE 2,510,464

MACHINE FOR SEALING CONDENSER BODIES IN SHELLS

Harold I. Danziger, West Orange, N. J.

Application October 11, 1946, Serial No. 702,874

5 Claims. (Cl. 18—5)

This application is a division of my pending application Serial No. 460,016 filed September 28, 1942, now Patent No. 2,419,484, and entitled Condenser assembling machine. The present invention relates particularly to a machine for sealing the ends of electrical condensers.

It is an object of my invention to provide a novel and improved machine for centering condenser bodies in their shells and sealing the ends of the shells while the condenser bodies are held so centered.

It is another object to provide a machine for automatically sealing the ends of electrical condensers in succession.

It is another object to provide a sealing machine of the character mentioned which is simple in construction and adapted for carrying out effectively the sealing function required in the commercial production of electrical condensers.

It is another object to provide a sealing device which is adapted for combination with assembling devices to produce electrical condensers automatically on a commercial basis.

These and other objects of my invention lie in the details of construction, arrangement of parts and combinations of elements which are incorporated in the embodiment of my invention herein particularly shown, and will be apparent from the following description and the appended claims.

In the description of my invention reference is had to the accompanying drawings, of which:

As shown in my abovementioned pending application, the sealing device of my invention has been incorporated in a complete machine for automatically assembling electrical condensers, wherein the device centers the condenser bodies in their shells and then seals the ends of the shells to secure the condenser bodies in place. This sealing device may be employed without the other assembling components of this assembling machine but with parts of the frame and feed mechanism to provide a complete sealing machine wherefore such parts of the assembling machine as are necessary to form this complete sealing machine are herein next described.

Figure 1:
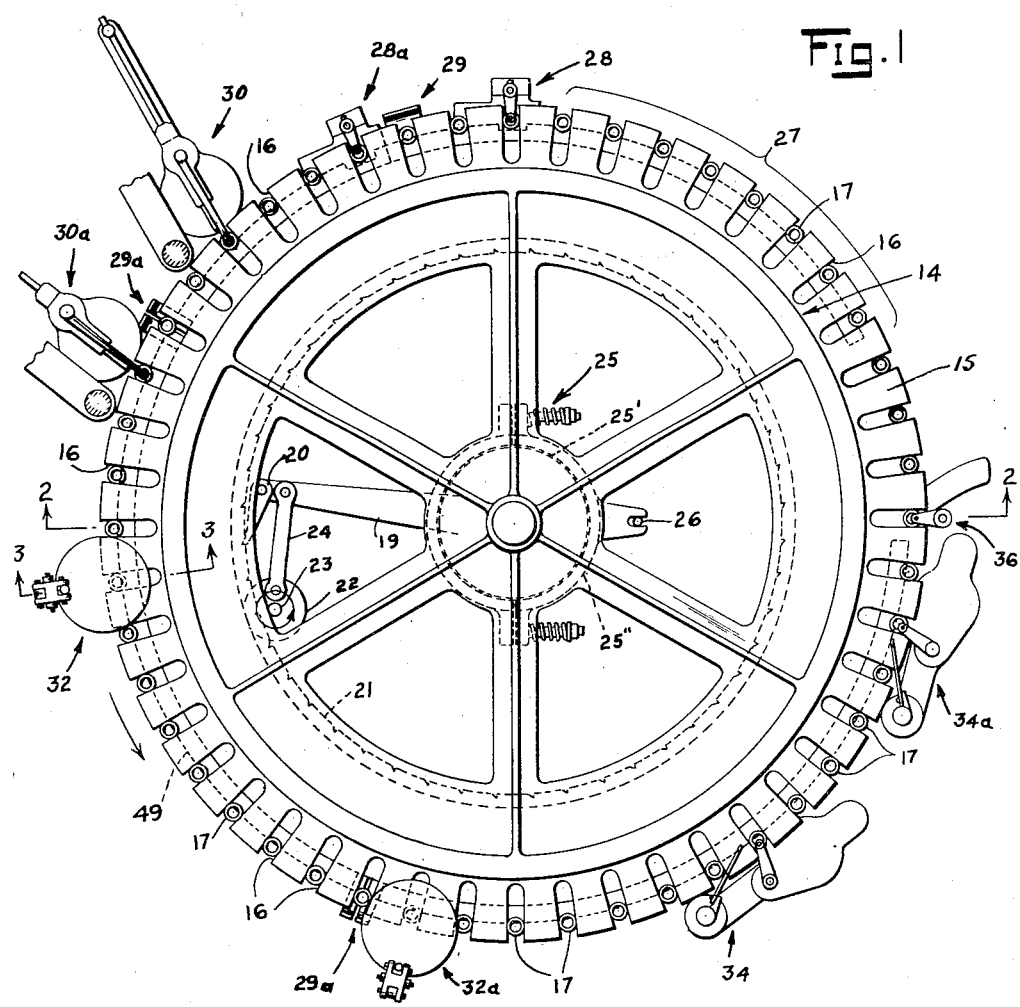
Figure 1 is a top plan view of a condenser assembling machine in which my invention is incorporated.
Figure 2:
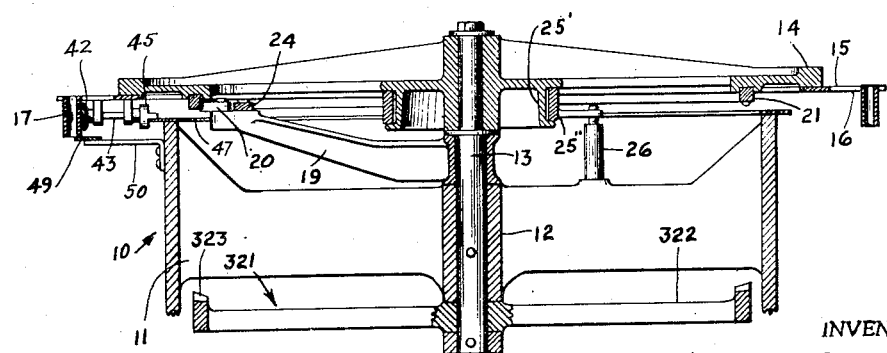
Figure 2 is a vertical section taken substantially on the line 2—2 of Figure 1.

In Figures 1 and 2 there will be seen a main frame 10 of a generally circular form as viewed from the top. This frame has radial webs 11 supporting a central bearing 12 in which there is journalled a vertical shaft 13. Carried by the shaft 13 above the frame is a circular table 14 comprising a central spider and a circular horizontal shelf 15 disposed about the periphery of the spider. In the shelf at equally spaced intervals are radial slots 16, and disposed in each slot is a tumbler 17. These tumblers are in the form of tubes having bores to receive snugly the shells 18 and condenser bodies 18' which are to be coated.

In the operation of the machine, the table is advanced with an intermittent rotary motion in a counterclockwise direction, the distance of each interval of advance being such as to move each tumbler 17 into the position previously occupied by the one immediately ahead of it. This intermittent advance of the table is effected by a ratchet mechanism comprising a lever 19 pivoted on the shaft 13 beneath the table and pivotally carrying a pawl 20 which engages a circular rack 21 mounted on the underside of the table. A reciprocatory movement of the lever such as will advance the table intermittently an interval at a time is effected by a rotating wheel 22 carried by a shaft 23 and coupled by a link 24 to the lever 19. A brake 25, which comprises a drum 25' and a brake band 25" that frictionally embraces the drum and is held stationary to the frame by a post 26, serves to prevent inertia over-running of the table at the end of each advance and to hold the table stationary between successive advances.

The tumblers are journalled to standards which depend from the shelf 15 at opposite sides of each slot 16. This journalling is done so that the tumblers may be inverted to permit like operations on opposite ends of the condenser bodies by identical mechanisms, but for the purposes of the present invention the tumblers may be fixedly held to the shelf in upright positions as shown. Such upright positioning of the tumblers is maintained by coupling a trunnion of each tumbler by gearing 42 to a radially extending shaft 43 journalled in standards 44 of the shelf, and by locking the shafts 43 by securing heads 45 to the ends thereof which have horizontal diametrical tongues 46 that slide, as the table is moved, on stationary arcuate plates 47 carried by the frame 10. In order to retain the condenser bodies in the tumblers, there are provided stationary plates 49, held by brackets 50 to the frame 10, which lie below the tumblers and extend along the path of travel thereof to slidably support the condenser elements. These stationary plates have open spaces at certain stations to permit assembling operations on the lower ends of the condenser bodies and automatic ejection of the bodies from the machine as will hereinafter appear.

The operation of the overall machine shown in Figures 1 and 2 may be briefly noted. At the place designated by the reference numeral 27 in Figure 1 there is a loading station whereat the condenser shells 18 and bodies 18' are inserted by hand in the successive tumblers as the table is advanced. Following the loading station there are, in the sequence here-named, a first tinning station 28 for coating the lower end of each condenser body with solder, a turning station 29 for inverting the tumblers, a second tinning station 28a, a soldering station 30 for securing a terminal to the lower end of each condenser body, a second turning station 29a, a second soldering station 30a, a sealing station 32 for sealing the upper end of each shell, a third turning station 29a, a second sealing station 32a, a testing station 34 for testing each condenser for short circuits and ejecting it if it is defective, a testing station 34a for testing each condenser for capacity and ejecting it if its capacity exceeds prescribed tolerances, and an ejecting station 36 for ejecting each condenser from the machine which has passed the testing stations.

The present invention is concerned particularly with the sealing station 32 and is herein next described in detail.

Figure 3:
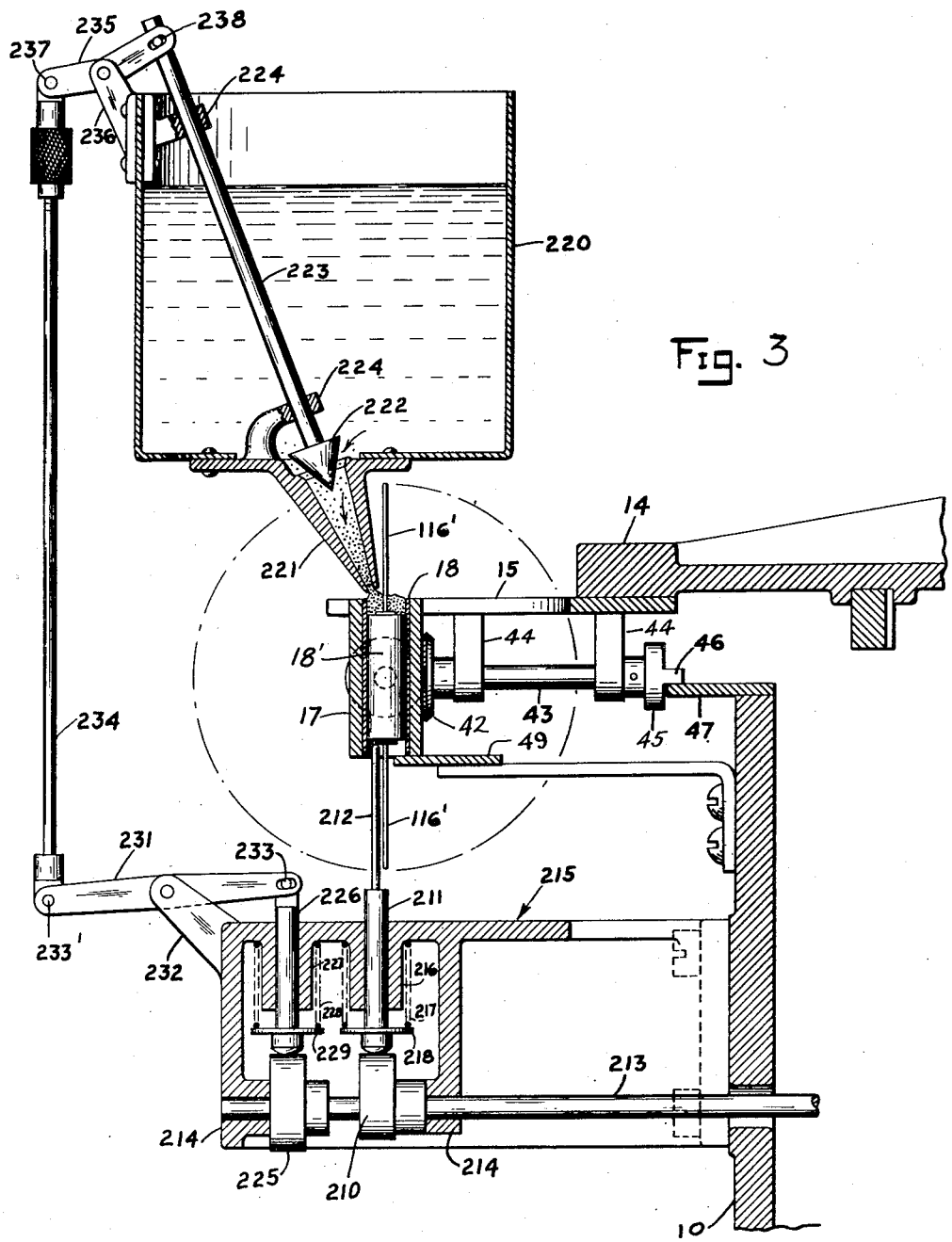
Figure 3 is a fractional vertical section, to enlarged scale, taken substantially on the line 3—3 of Figure 1 and showing the sealing device according to my invention.

At the sealing station 32, shown in detail in Figure 3, the condenser bodies are first centralized in their respective shells to provide equal spaces at the ends, and then the upper end space in the shell is sealed, preferably by filling the end space with a wax or other suitable material. The centralizing is done by a one-lobe cam 210 acting through a plunger 211 and push rod 212 as is shown in Figure 3. The cam 210 is pinned to a horizontal shaft 213 which is journalled at 214 to a housing 215 that is secured to the main frame 10. The plunger 211 is slidable mounted, in a position above the cam 210 and beneath the tumbler at this station, in an apertured boss 216 which depends from the top wall of the housing 215. A downward biasing of the plunger 211, to maintain it in contact with the periphery of the cam 210, is effected by a compression spring 217 which is coiled about the boss 216 and interposed between the top wall of the housing and a collar 218 on the plunger. The shaft 213 is coupled to the drive for the table 14 (by means not herein necessary to show) so that it is rotated continuously through one complete revolution for each step of advance of the table 14, it being so timed that the lobe of the cam 210 traverses the plunger rod during successive rest periods of the table. As the plunger traverses the cam lobe, the rod 212 is moved up into the tumbler at this sealing station to centralize the condenser body in relation to its shell, and as the plunger traverses the recession of the cam the rod is retracted from the tumbler. In order that the condenser body will be held centralized for a definite interval, the lobe of the cam 210 is provided with a suitable dwell.

While the condenser body is held centralized, a molten wax is poured into the top end space of the condenser shell from a container 220 through a snout 221, the container being supported above the shelf 15 and the snout being extended down from the bottom of the container as is shown in Figure 3. The discharge of the wax from the container is controlled by a metering valve 222 carried on the lower end of a long stem 223 which extends up through the wax to the top of the container, the stem being slidably mounted in bearings 224 to move vertically to place the valve into open and closed positions. The valve is controlled by a one-lobe cam 225 which is pinned to the shaft 213 adjacently of the cam 210. This cam 225 acts on a plunger 226 which is slidably mounted on the housing 215 in a boss 227 as in the manner of the plunger 211, the plunger 226 being likewise maintained in contact with the periphery of the cam 225 by a compression spring 228 which is coiled about the boss and interposed between the housing and a collar 229 on the plunger. The plunger 226 is coupled to the valve 222 through a rocker system comprising a lever 231 fulcrumed to a standard 232 of the housing 215 and having at one end a slidable pivotal connection 233 to the plunger 226 and at the other end a pivotal connection 233' to the lower end of a vertically disposed rod 234, and a rock lever 235 fulcrumed to a standard 236 on the container 220 and having at one end a pivotal connection 237 to the rod 234 and at the other end a slidable pivotal connection 238 to the upper end of the valve stem 223. Through this rocker system the valve 222 is opened and closed in response to upward and downward movements of the plunger 226, the plunger being moved upwardly by the cam 225 as it traverses the lobe of the cam 225 and moved down by the spring 228 as it traverses the recession of the cam. The lobe of the cam 225 is aligned with that of the cam 210, but is preferably provided with less angular length than that of the cam 210. This is done in order that the valve 222 will be closed to terminate the wax discharge before the push rod 212 is withdrawn from the tumbler.

The above described sealing operation is repeated once for each step of advance of the table 14. Thus, successive condenser bodies are automatically centered in their respective shells and sealed in place by filling the upper ends of the shells with a molten sealing material.

Preferably, the present sealing machine includes a turning station 29 and a second sealing station 32a, less the above described centering means, so that both ends of each condenser are sealed automatically. Also, this machine desirably includes the station 36 for automatically ejecting the sealed condensers from the machine. These additional stations form however no part of the invention herein claimed and need not be herein described, but a description thereof will be found in my pending parent application abovementioned.

The embodiment of my invention herein particularly shown will be understood to be illustrative and not limitative of my invention as the same is subject to changes and modifications without departure from the scope of my invention which I endeavor to express according to the following claims.

I claim:

1. In a machine for sealing loose condenser bodies in condenser shells: the combination of a conveyor removably carrying a series of vertically disposed condenser bodies and shells, said bodies being shorter than the respective shells and being loosely disposed therein, support means at the bottom of said shells for holding the respective bodies therein, means for intermittently advancing said conveyor, a vertically reciprocating member below said conveyor timed with said advancing means for entering each shell from the bottom, when the same is at a predetermined station and said conveyor is at rest, to raise the respective condenser body to a mid-position with respect to the shell, and sealing means at said station and timed with said reciprocating member for supplying a sealing material into the upper end space of the condenser shell at said station simultaneously while said member is raised to support the respective condenser body in its said mid-position.

2. Apparatus for sealing loose condenser bodies in condenser shells in succession, comprising conveying means having a series of vertically positioned open-ended containers for condenser shell and body elements, said shells being held fixed in said containers and the bodies being loosely fitted into said shells; a support means partially closing the lower ends of said containers for retaining said bodies therein; means operated intermittently to enter said containers in succession from the bottom and centralize the respective bodies in their shells; and means, actuated intermittently in timed relation with said centralizing means, for supplying a sealing material into the top end space of each shell while the respective body is held centralized therein.

3. In a machine for sealing loose condenser bodies in condenser shells: the combination of a vertically positioned open-ended holder containing a condenser shell and body, said shell being substantially longer than said body; a member movable upwardly into said shell from the bottom to place said body into a centralized position in relation thereto; means operable to discharge a quantity of sealing material into the top end of said shell; and means timed to actuate said centralizing means, to hold said discharge means open for a predetermined interval, and thereafter to retract said centralizing means, in the sequence here named.

4. In a machine for sealing loose condenser bodies in condenser shells: the combination of a conveyor having a series of holders for carrying respective condenser shells each having a condenser body contained loosely therewithin; a support member below said holders for defining the lowermost positions of said bodies and shells; centralizing means stationed below said holders and operable to raise a condenser body to a mid position in relation to its shell; sealing means positioned to supply a quantity of sealing material to the top end of the shell whose condenser body is held centralized; means to intermittently advance said conveyor to bring said holders successively into alignment with said centralizing and sealing means; and means timed with said advancing means to operate said centralizing and sealing means during the rest periods of said conveyor.

5. Apparatus for sealing loose condenser bodies in respective shells, comprising a conveying means for a series of shells and respective body elements contained therein, means for intermittently advancing said conveying means, means timed with said advancing means for positioning said bodies successively in their respective shells during successive rest periods of said conveying means, and means coupled to said positioning means for sealing the ends of successive shells while said respective bodies are held positioned therein.

HAROLD I. DANZIGER.

REFERENCES CITED

The following references are of record in the file of this patent:

UNITED STATES PATENTS

| Number | Name | Date |
|---|---|---|
| 1,302,237 | Sokolow et al. | Apr. 29, 1919 |
| 1,306,643 | Swan | June 10, 1919 |
| 1,627,601 | Goebel | May 10, 1927 |
| 2,087,809 | Nichols et al. | July 20, 1937 |